(12) United States Patent
Bryant et al.

(10) Patent No.: US 10,901,865 B2
(45) Date of Patent: Jan. 26, 2021

(54) ERROR DETECTION FOR PROCESSING ELEMENTS REDUNDANTLY PROCESSING A SAME PROCESSING WORKLOAD

(71) Applicant: Arm Limited, Cambridge (GB)

(72) Inventors: Richard F Bryant, Chandler, AZ (US); Sridharan Balasubramanian, Chandler, AZ (US); Joseph Anthony Delgross, Chandler, AZ (US)

(73) Assignee: Arm Limited, Cambridge (GB)

( * ) Notice: Subject to any disclaimer, the term of this patent is extended or adjusted under 35 U.S.C. 154(b) by 117 days.

(21) Appl. No.: 16/374,103

(22) Filed: Apr. 3, 2019

(65) Prior Publication Data

US 2020/0319984 A1 Oct. 8, 2020

(51) Int. Cl.
*G06F 11/20* (2006.01)
*G06F 11/16* (2006.01)

(52) U.S. Cl.
CPC ...... *G06F 11/2035* (2013.01); *G06F 11/1629* (2013.01); *G06F 11/1675* (2013.01); *G06F 2201/85* (2013.01)

(58) Field of Classification Search
CPC ............ G06F 11/1629; G06F 11/1675; G06F 11/2035; G06F 2201/85
See application file for complete search history.

(56) References Cited

U.S. PATENT DOCUMENTS

| | | | | |
|---|---|---|---|---|
| 6,948,092 B2* | 9/2005 | Kondo | ................ | G06F 11/1441 714/12 |
| 2004/0199813 A1* | 10/2004 | Hillman | ................ | G06F 11/181 714/13 |
| 2013/0124922 A1* | 5/2013 | Van Stensel | ........ | G06F 11/1675 714/37 |
| 2016/0283314 A1* | 9/2016 | Thanner | ................ | G06F 11/165 |

OTHER PUBLICATIONS

Gizopoulos et al., "Architecture for Online Error Detection and Recovery in Multicore Processors", Mar. 2011, IEEE:Design, Automation & Test in Europe, Grenoble, pp. 1-6 (Year: 2011).*

* cited by examiner

*Primary Examiner* — Kamini B Patel
*Assistant Examiner* — Indranil Chowdhury
(74) *Attorney, Agent, or Firm* — Nixon & Vanderhye P.C.

(57) ABSTRACT

An apparatus has two or more processing elements to redundantly process a same processing workload; and divergence detection circuitry to detect divergence between the plurality of processing elements. When a correctable error is detected by error detection circuitry of an erroneous processing element, the erroneous processing element signals detection of the correctable error to another processing element, to control the other processing element to delay processing to maintain a predetermined time offset between the erroneous processing element and the other processing element.

19 Claims, 8 Drawing Sheets

ERROR DETECTION FOR PROCESSING ELEMENTS REDUNDANTLY PROCESSING A SAME PROCESSING WORKLOAD

BACKGROUND

Technical Field

The present technique relates to the field of data processing.

Technical Background

For some fields of use, such as in the automotive field, it may be required to provide a data processing system which provides certain guarantees of functional safety. One technique for improving robustness against errors may be to provide two or more processing elements which may redundantly process the same processing workload. Divergence between the respective processing elements may be detected, and if divergence is detected then an error handling response may be taken. This can help protect against errors caused by particles strikes or other momentary glitches, as well as hard faults caused by physical deterioration of the integrated circuit components.

SUMMARY

At least some examples provide an apparatus comprising:
a plurality of processing elements to redundantly process a same processing workload; and divergence detection circuitry to detect divergence between the plurality of processing elements;
each processing element comprising error detection circuitry to detect a correctable error in that processing element, and error correction circuitry to correct the correctable error; in which:
when a correctable error is detected by the error detection circuitry of an erroneous processing element, the erroneous processing element is configured to signal detection of the correctable error to another processing element, to control the other processing element to delay processing to maintain a predetermined time offset between the erroneous processing element and the other processing element.

At least some examples provide an apparatus comprising:
a plurality of means for data processing for redundantly processing a same processing workload; and
means for detecting divergence between the plurality of processing elements;
each means for data processing comprising means for detecting a correctable error in that means for data processing, and means for correcting the correctable error; in which:
when a correctable error is detected by the means for detecting of an erroneous means for data processing, the erroneous means for data processing is configured to signal detection of the correctable error to another means for data processing, to control the other means for data processing to delay processing to maintain a predetermined time offset between the erroneous means for data processing and the other means for data processing.

At least some examples provide a method for an apparatus comprising a plurality of processing elements; the method comprising:
redundantly processing a same processing workload on the plurality of processing elements;
detecting divergence between the plurality of processing elements;
detecting a correctable error in an erroneous processing element, the correctable error being correctable by error correction circuitry of the erroneous processing element; and
in response to detection of the correctable error in the erroneous processing element, signalling detection of the correctable error to another processing element, to control the other processing element to delay processing to maintain a predetermined time offset between the erroneous processing element and the other processing element.

Further aspects, features and advantages of the present technique will be apparent from the following description of examples, which is to be read in conjunction with the accompanying drawings.

DESCRIPTION OF EXAMPLES

Figure 1:
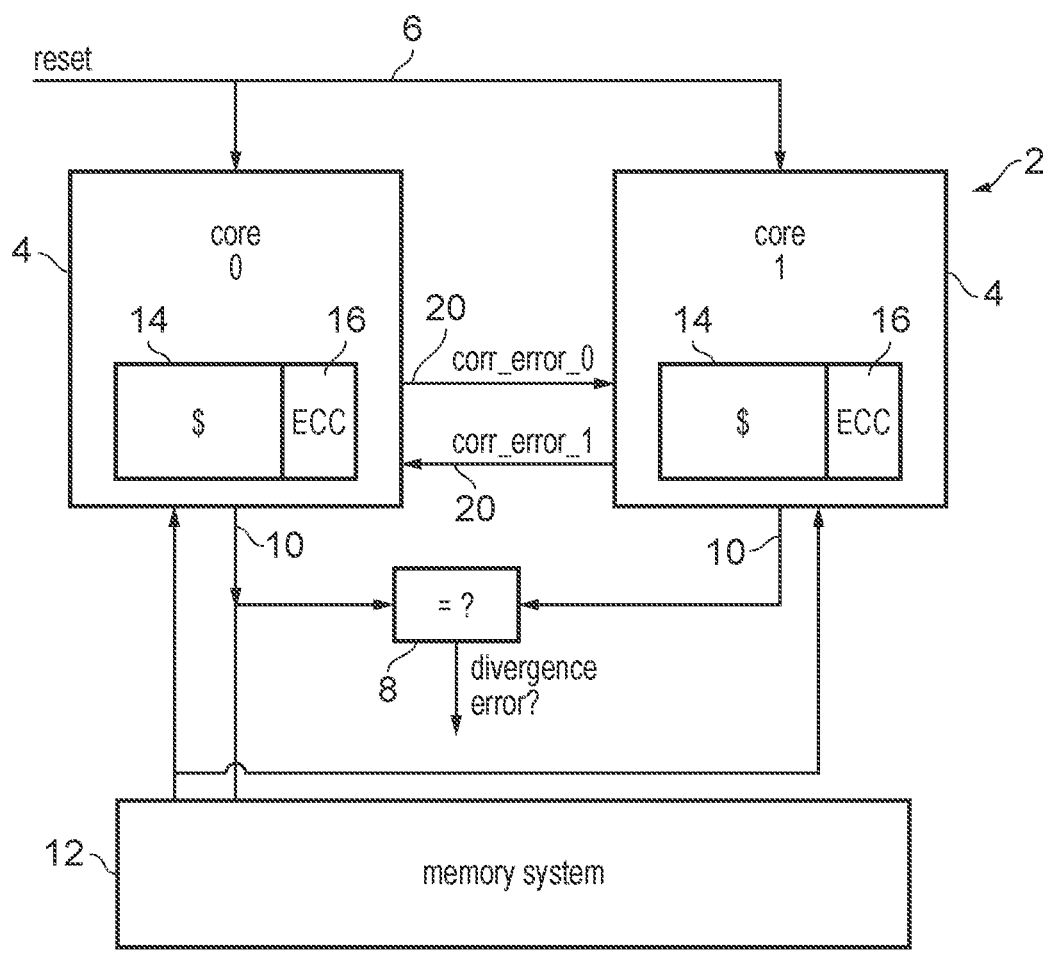
FIG. 1 illustrates an example of an apparatus having multiple processing elements for redundantly processing a same workload.

An apparatus may have two or more processing elements for redundantly processing a same processing workload, and divergence detection circuitry to detect divergence between the processing elements. When divergence between the processing elements is detected, this may indicate an error has occurred, and then an action can be taken such as resetting the system, or in the case of systems with more than two processing elements, removing one of the processing elements from active use and then continuing processing with fewer processing elements. However, resetting the system means that the system is out of operation for a period and has an impact of performance, while removing processing elements from the redundant set reduces the reliability of the system since there are now fewer processing elements checking each other's processing workload.

As well as certain incorrectable errors, which cannot be corrected within a processing element, it is also possible to detect some correctable errors, for which error correcting circuitry is provided to correct the correctable error. However, if one processing element encounters a correctable error and corrects it, this may cause divergence between that processing element and another of the redundant processing elements which did not encounter the error. This is because a certain latency may be incurred when an error is corrected, which may not be incurred in other cases. One approach is simply to treat correctable errors as failure of redundancy, and to detect the resulting divergence with the divergence detection circuitry. However, in this case one might as well not provide any error correction circuitry at all. The redundancy failure detected by the divergence circuitry may require more drastic action which may have a more serious impact on the reliability of the system and on performance than if it was possible to correct the correctable error within the processing element.

Another approach can be that the latency of the error correction circuitry is incurred on every processing operation which could potentially encounter a correctable error, regardless of whether any error actually occurred. This would ensure that even if one of the processing elements encountered the correctable error and the other does not, the latency on both processing elements would be the same so that a predetermined time offset between the elements can be maintained to allow for the correct detection of divergence. However, in this case the latency of the correction is incurred on all operations, which may have a significant performance impact.

In the techniques discussed below, when a correctable error is detected by the error detection circuitry of an erroneous processing element, the erroneous processing element signals detection of the correctable error to another processing element, to control the other processing element to delay processing to maintain a predetermined time offset between the erroneous processing element and the other processing element. While it may seem counter-intuitive to cause a delay at another processing element which did not itself detect a correctable error, by doing so this allows a fixed time offset to be maintained between the respective processing elements, so that reliable divergence detection between the redundant workloads is possible. By signalling a correctable error detected at one processing element to another processing element, this means that it is not necessary to incur the latency of the error correction process on every operation which could potentially encounter a correctable error, thus improving processing performance.

Hence, this allows the system to be resilient to correctable errors while keeping the respective processing elements in lockstep, and reduces the frequency with which divergence is detected between the processing elements in comparison to alternative approaches where correctable errors are not corrected within the processing elements but are instead treated as a divergence error.

The delay in processing (which is applied at the other processing element when receiving the signal that the correctable error has been detected at the erroneous processing element) could be controlled in different ways. In one example each processing element may have a certain signal path which can add an additional delay to the normal processing path, where that delay has been calibrated to be equivalent to the delay of performing the error correction operation at the erroneous processing element.

However, in many cases, it may be simpler for the other processing element to delay processing by itself performing an error correction operation using the error correction circuitry of the other processing element. Hence, even though the other processing element did not itself encounter any correctable error, it can nevertheless trigger an error correction operation to be performed so that it will incur the same latency as the erroneous processing element would when correcting the correctable error that was detected at the erroneous processing element. This approach can be more efficient in hardware since it avoids the need to provide an additional delay timing path separate from a path involved in performing the error correction operation. Since the other processing element itself will need to have the error correction path in case it detects a correctable error, then it may be more efficient to simply trigger that error correction path to be taken when the other processing element receives the signal indicating that the correctable error was detected at the erroneous processing element.

The error correction operation could be performed in different ways. In one example the error correction operation could comprise flushing and re-executing at least one instruction. For example an instruction that required a data value which was found to be erroneous could be flushed and then re-executed using an error-corrected value generated by the error correction circuitry. Also, younger instructions than the instruction which encountered the error could be flushed and re-executed. Also, when flushing and re-executing the instruction and any younger instructions, the error correction circuitry could write the error-corrected value to a storage element to replace the erroneous value in which the correctable error was detected, and then by the time the corresponding instructions are re-executed then the correct value will be available. This operation can be performed at the erroneous processing element to handle the correctable error detected by the error detection circuitry of that processing element, but can also be performed at the other processing element so that the other processing element will delay its processing by an equivalent delay to that incurred at the erroneous processing element, to maintain the processing element in lockstep the predetermined offset.

Alternatively, another approach could be that the error correction operation could comprise delaying execution of an instruction to allow the instruction to use a delayed output of the error correction circuitry. In this case, it may not be necessary to flush a pipeline and re-execute instructions, but instead the instruction can be delayed for sufficient time to allow it to use the error-corrected result rather than a value obtained prior to triggering the error correction operation. For example, each processing element could include an error correction signal path which traverses the error correction circuitry, and a bypass signal path which bypasses the error correction circuitry. In cases with no error, the bypass signal path could be selected, which may allow instructions to be processed with a shorter processing delay that when the error correction signal path is used. The erroneous processing element may select the error correction signal path when it detects the correctable error, and delay its instructions sufficiently to allow the output of the error correction signal path to be used. The erroneous processing element may also signal detection of the correctable error to the other processing element so that it can also delay its instruction to allow it to use the output of the error correction signal path at the other processing element, maintaining the lockstep relationship between the processing elements.

Note that, in either case, the calculation of an error-corrected value could be triggered speculatively regardless of whether an error is detected. It is not necessary to wait until a correctable error has actually been detected at either the current processing element or the other processing element before starting the calculation of the error-corrected value, since if no error is detected then the error-corrected value could simply not be used, but by speculatively starting the calculation regardless of whether an error arises, then this can reduce the delay associated with performing the error correction operation.

The technique discussed above could be applied to systems in which the predetermined time offset between corresponding operations at the respective processing elements is zero. In a system with zero time offset between the redundant processing elements, each processing element may be capable of signalling its correctable errors to each of the other processing elements in the set of redundant elements, since the zero offset may mean that the signal from the erroneous processing element may reach the other processing element in sufficient time to be able to apply the delay to the equivalent processing operation being performed by the other processing element.

The technique can also be used in systems which have a non-zero time offset between the respective processing elements. Some redundant systems introduce a time offset between corresponding operations being performed at the respective processing element, as this can provide extra robustness against all of the processing elements being subject to a common mode failure where the same error affects all of the cores in the same way so that such an error could not be detected by the divergence detection circuitry. For example, such common mode fault could be caused by glitches on a clock signal. Hence, in a system with non-zero offset, the processing elements may include an early processing element and a later processing element, for which the earlier processing element may perform a given processing operation before the later processing element performs the same given processing operation.

When a correctable error is detected at the earlier processing element, the earlier processing element may be capable of controlling the later processing element to delay its processing in response to the correctable error detected at the earlier processing element. As the later processing element will be behind the earlier processing element, then there is sufficient time to signal the correctable error to the later processing element before the later processing element proceeds beyond the point at which a given processing operation can no longer be subject to the error correction operation.

However, there may be a greater challenge in signalling correctable errors detected at the earlier processing element back to the earlier processing element. Some embodiments may choose not to perform such signalling of errors from a later processing element to the earlier processing element at all. Hence the later processing element may be unable to control the earlier processing element to delay its processing when a correctable error is detected at the later processing element. This may mean that even if correctable errors are detected at the later processing element, this may still be treated as a divergence error and may trigger a failure of redundancy. Nevertheless, by at least providing one-way signalling of correctable errors from an earlier processing element to a later processing element to trigger the later processing element to delay its processing to match the latency incurred in correcting error at the earlier processing element, this still provides an improvement over systems which do not provide such cross-signalling of correctable errors between processing elements at all, since at least those correctable errors detected at the earlier processing element may not lead to detection of divergence and hence failure of redundancy.

However, in other implementations, the later processing element may be able to control the earlier processing element to delay the processing when a correctable error is detected at the later processing element. This can be achieved in a number of different ways. In general, some additional delay may be imposed in order to provide sufficient time for the signal of the correctable error detected by the later processing element to reach the earlier processing element before the operation which is to be delayed based on the correctable error has proceeded beyond the point at which it can be halted or have the error correction operation applied.

One approach can be that the apparatus can include clock gating circuitry which may selectively gate clock signals supplied to a portion of the earlier processing element other than the error correction circuitry, a portion of the later processing element other than the error correction circuitry, and the divergence detection circuitry. When a clock signal is gated, this means that some clock pulses of the clock signal are suppressed, so that the clock signal may be held at a fixed value for a longer period, which may effectively freeze the operation of a processing element, by preventing flip-flops being clocked and hence preventing processing operations from progressing. Hence, when a correctable error is detected at the later processing element, the clock gating circuitry may gate the clock signal supplied to a portion of the earlier processing element other than the error correction circuitry, so that the processing operation which could be affected by the error can be held back but nevertheless the error correction circuitry can proceed to apply the error correction operation to incur the extra latency. As the portion of the earlier processing element other than the error correction circuitry is delayed by gating its clock signal, a corresponding delay would also need to be provided to the portion of the later processing element other than the error correction circuitry and the divergence detection circuitry, to maintain both processing elements in lockstep and ensure that the divergence detection circuitry has its operation delayed by a corresponding amount. This maintains the system in lockstep. In systems having more than two processing elements, corresponding delays may be needed at each of the other processing elements.

Alternatively, rather than introducing a selective delay through clock gating, another approach could be that each processing element may comprise delay circuitry to provide an additional delay between the error detection circuitry performing error detection and processing circuitry of the processing element starting a processing operation using a value on which error detection is performed, regardless of whether a correctable error is detected at either that processing element or another processing element. Hence, with this approach the additional delay is a fixed delay incurred on all operations (however unlike the alternative approach discussed above where the error correction operation is performed on all operations, this additional fixed delay does not need to be long enough to match the latency of the full error correction operation, but may be a shorter delay which is just enough to allow the error detected at the later processing element to be signalled to the earlier processing element in time to hold back the processing operation corresponding to the one affected by the error at the later processing element). While this additional delay is primarily intended to allow the earlier processing element to delay its use of a value subject to error detection by a sufficient latency that there is time to receive the error detection signal from the later processing element, an equivalent additional delay would also be needed at the later processing element so that it can maintain lockstep. With this approach, although when a processing pipeline is not fully occupied, this additional delay may reduce performance, once the pipeline is fully stacked then the pipelining of operations may mean that the additional delay may be hidden since the incremental delay of handling each successive operation could just be a single cycle regardless of the presence of the additional delay. In any case, some implementations may find it acceptable to incur the performance impact of the additional delay in systems where improving reliability and reducing probability of redundancy failure are considered more important than improving processing performance. By introducing the additional delay, in addition to the selective delay associated with performing error correction when an error is detected at any of the processing elements, this allows a later processing element in a time-offset redundant system to signal their correctable errors to an earlier processing element, to allow correctable errors in either processing element to be addressed without requiring a divergence and redundancy failure.

Some implementations may permanently configure the processing elements to operate in a lockstep mode where they redundantly process a same processing workload. However, in other implementations, the processing elements may have a split mode and a lock mode. In the split mode, the processing elements may be configured to process independent processing workloads. Hence, in the split mode the divergence detection circuitry could be disabled, and in this case higher performance may be possible since the number of different processing workloads which can be processed simultaneously can be increased. On the other hand, in the lock mode, the processing elements may redundantly process the same processing workload as discussed above, and the divergence detection circuitry may be enabled.

The error detection circuitry and error correction circuitry may be active in both split mode and lock mode. However, in the split mode, the cross-signalling of correctable errors between processing elements may be disabled, as in the split mode there is no need to maintain the processing elements in lockstep and so higher performance can be achieved by allowing another processing element which did not encounter a correctable error to continue undelayed even when a correctable error is detected at the erroneous processing element. Hence, in some cases the signalling of detectable errors between processing elements and the delaying of processing of a non-erroneous processing element based on a correctable error at an erroneous processing element may be performed only in the lock mode and not in the split mode.

This technique could be applied to a range of different kinds of correctable error. However, it is particularly useful for handling correctable errors in a stored value which may be detected based on an error detecting code or an error correcting code associated with a stored value. For example, data stored to a cache or memory may, on writing, have the corresponding error detecting code or error correcting code computed based on the written data value and then on reading the data from the cache or memory, the expected error detecting code or error correcting code for the stored data value can be computed and compared against the error detecting code or error correcting code that was stored in association with the stored value. If a single bit error or multi-bit error has occurred in the stored value, for example due to interference from sub-atomic particles or electromagnetic radiation, then this can be detected from a mismatch of the expected and stored error detecting codes or error correcting codes.

If the stored value is associated with an error correcting code, then the error correction circuitry may correct the correctable error by generating an error-corrected value of a stored value based on the associated error correcting code. Different types of error correcting codes could be used, such as Hamming codes or cyclic redundancy check (CRC) codes. Some error correcting codes may only be able to correct single-bit errors, while others may be able to correct multi-bit errors due to added redundancy in the stored error correction code. Some error correcting codes may allow correction of a single error, but for double-bit errors may only be able to detect them but not correct them, these codes being known as single error correct double error detect (SECDED) codes. Hence with such codes an error would be regarded as correctable if it is a single-bit error, but multi-bit errors would be regarded as non-correctable.

One may think that values associated with an error detecting code would not be able to have correctable errors detected. However, there may be a cache storing read-only information, such as instructions in an instruction cache, or page table data in a translation lookaside buffer. Such read-only information may have been fetched from memory and the original copy of the information may still be stored in memory. Hence, for such read-only cached information, the error correction circuitry may correct the error by requesting re-fetching of the information from a memory system. Hence, it is possible for detected errors based on error detecting codes to be considered correctable errors, even if the error detecting code is not itself able to provide the correct value. Examples of error detecting codes can include parity codes, checksums, or SECDED codes in the case when a double-bit error occurs.

Some redundant systems may include two or more independent sets of redundant processing elements, where the processing elements within the same set may redundantly process the same processing workload, but each set of processing elements can process a different processing workload concurrently. Hence, in such a system the signalling of correctable errors between processing elements may only be between the processing elements within the same set of processing elements, and there may be no cross-signalling of correctable errors from a processing element in one set to a processing element in another set. The examples shown in the drawings only show a single set of redundant processing elements, but it will be appreciated that this set could be provided one, two, or more times, and so an apparatus may have multiple sets of processing elements each as shown in the single-set examples discussed below.

FIG. 1 shows an example of a data processing system 2 having two redundant processing elements (processor cores) 4 which may operate in lockstep to process the same processing workload (the same stream of instructions are provided to both processing elements 4). The cores are connected to a common reset signal 6 so that when the system is reset the cores are triggered to reset simultaneously. In this example there is a zero time offset between the operations on each core so that the two processor cores 4 function entirely in parallel. A comparator 8 functions as divergence detection circuitry for detecting any divergence between outcomes of the respective processor cores. In this example the divergence comparator 8 receives any memory access requests 10 issued by either core 4 to a memory system 12 and compares the respective memory access requests to check whether they match. If they match then no divergence error is signalled, and the memory access request from one of the processor cores (in this example core 0) is passed to the memory system 12 for servicing. When a response to the issued memory access request is received from the memory system then the response is provided to both cores. By only forwarding a single memory access request to the memory system 12, this avoids timing differences being introduced due to the request from the second core hitting against cached data associated with the first core for example.

On the other hand, when the divergence comparator 8 detects divergence in the requests 10 issued by the respective cores, then an error is signalled and a response action is taken to address the failure of redundancy detected. For example the reset signal 6 may be asserted to reset the system to a known reset state to resume processing once more. Alternatively, when a divergence error is detected then a warning could be issued to a user, such as illuminating a light or sounding an alarm.

Although data values held in registers within a processor core could also be subject to errors, in general an error in a register will eventually result in an error in a subsequent memory access request 10, and so it may be sufficient to only provide a divergence comparator 8 on the memory access requests rather than comparing the results of every instruction of the respective cores, which would have a greater impact on performance. Some types of error arising in a processor core may be correctable within the core, and so do not necessarily need to trigger a redundancy failure. For example each core may have a cache 14, which could be a data cache, an instruction cache or a translation lookaside buffer for example. The information stored in the cache may be associated with an error correcting code 16 which provides added redundancy to allow bit flips in the stored value caused by particle strikes or electromagnetic interference to be detected and corrected. While FIG. 1 shows the error correcting code as separate from the cached data, in other examples the data value and related error correction code could be jointly encoded as a single value. Depending on the type of error correcting code 16, single bit errors (and optionally double bit errors) may be correctable. For caches which store read only information which is unchanged relative to the corresponding information in the memory system 12, it may also be possible to correct errors by providing error detecting code which can only detect errors but not correct them, so that errors can be corrected by refetching the read only data from the memory system 12.

Hence in general the processing elements 4 may each have some error detection circuitry for detecting correctable errors, and error correction circuitry for correcting the correctable error.

However, in practice it may be much quicker to detect that there is an error present than to be able to correct it. For example with a SECDED error correction code the detection that there is a single-bit error may be faster than the calculation of what the correct value should be. Also, when an error correction is performed then this may require delaying (e.g. flushing and re-executing) some instructions which may cause a further delay. Hence, the correction of a correctable error within a processing core 4 may incur added latency compared to a case where no error is detected. This could therefore lead to the divergence comparator 8 detecting divergence between the cores, if one of the cores corrects a correctable error (and so its memory access request 10 is delayed) but the other does not.

Hence as shown in FIG. 1, each core may be able to provide a correctable error detected signal 20 to the other core to inform the other core that it has detected a correctable error which will be corrected. Hence by sending the error signal 20 from one processor core 4 to the other redundant core, this may trigger the other core to perform a correction as well. This injection of a false correction at the other non-erroneous core allows that core to incur the same latency as the erroneous core to keep its execution in sync with the erroneous core. This cross-signalling of correctable errors between both cores therefore improves reliability because fewer errors will lead to a divergence which may reduce the frequency with which the more drastic redundancy error handling action is required.

Figure 2:
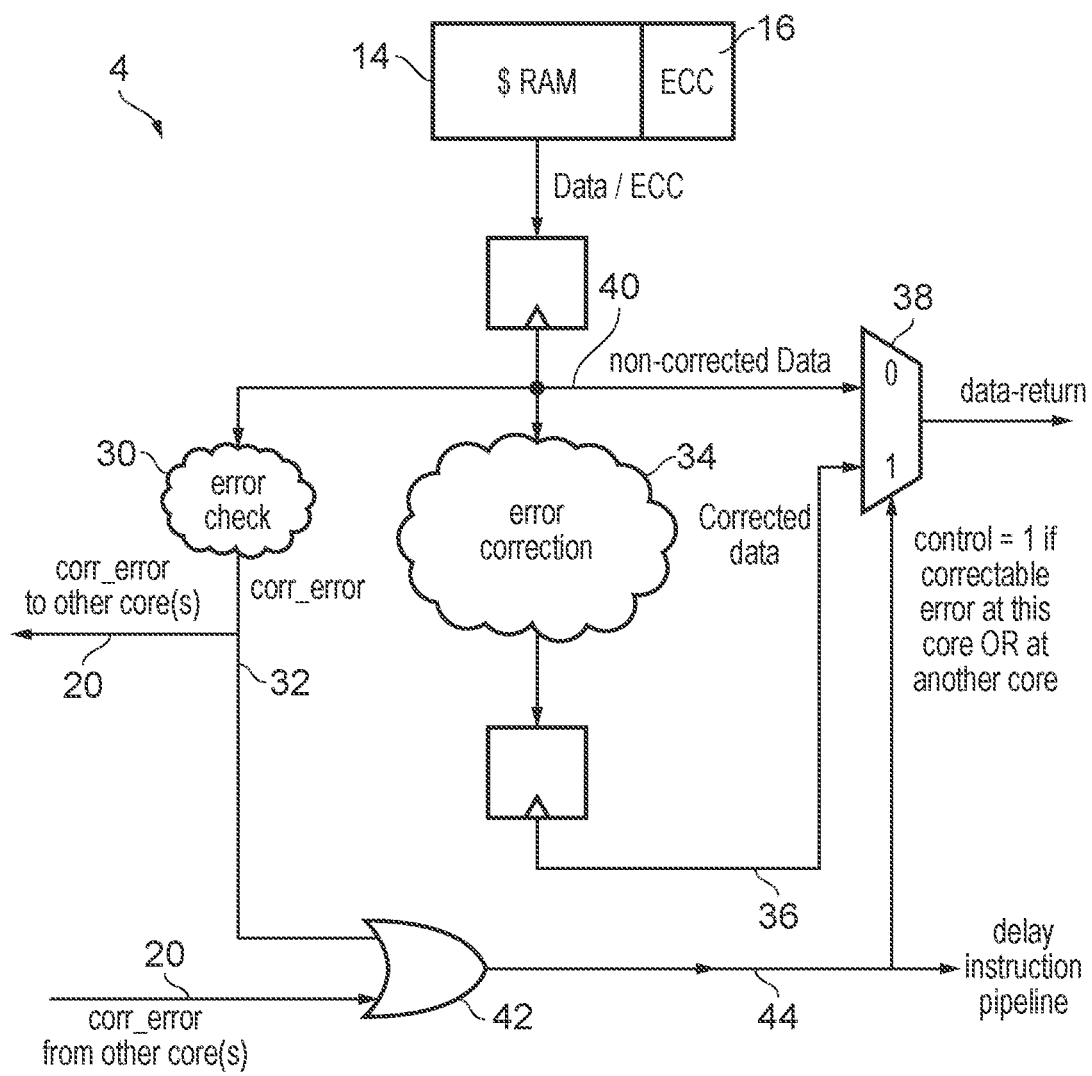
FIG. 2 shows a first example of error detection circuitry and error correction circuitry.

FIG. 2 shows a first example of logic within a given processing core for handling the error detection and correction. Data and the corresponding error correcting code (ECC) read from the cache 14 may be passed to error detection circuitry 30 which computes the expected error correction code for the stored data value and compares it with the stored error correction code 16, and if a mismatch is detected then the error detection circuitry 30 asserts a correctable error signal 32. This correctable error signal 32 is not only used within the core 4 shown in FIG. 2, but is also transmitted to other cores as the cross-core error signal 20 shown in FIG. 1.

In parallel with the error detection, the data and ECC may also be passed to error correction logic 34 which may speculatively compute a corrected data value 36 based on the stored value and its associated error correcting code. The corrected data value 36 is written back to the cache 14 together with its associated ECC, to overwrite the stored erroneous value.

A multiplexer 38 is provided to select between a bypass path 40 which bypasses the error correction logic 34 and the corrected data 36 provided by the error correction logic 34. The signal path through the error correction logic 34 has a greater latency than the bypass path 40.

An OR gate 42 combines the correctable error signal 32 generated by the error detection circuitry 30 in the current core with the cross-core error signal 20 received from any other cores, and the ORed signal 44 is provided to control the multiplexer 38 as well as controlling whether a delay is imposed on an instruction processing pipeline. Hence, when no correctable error has been detected either at the current core or at another core, then the pipeline is not delayed and the multiplexer 38 selects the non-corrected data from the bypass path 40 (the data value read from the cache 14), and this allows the corresponding instruction to be executed faster. However, if either the error detection circuitry 30 within the current core or corresponding error detection circuitry within other cores has detected a correctable error, then the output of the OR gate 42 will be asserted and so in this case the multiplexer 38 selects the corrected data 36 from the error correction signal path, and the instruction pipeline is delayed to allow the corresponding instruction to use the delayed output of the error correction circuitry 34 instead of the non-corrected data from the bypass path 40.

Hence, in a case when any of the redundant cores 4 detects a correctable error, each of those cores will select the error correction signal path through the error correction circuitry 34, and delay the instruction pipeline by equivalent amount so that the cores can remain in lockstep with a fixed time offset between them, so that the divergence comparison by comparator 8 can be reliable. This allows the system to be resilient to correctable errors.

Figure 3:
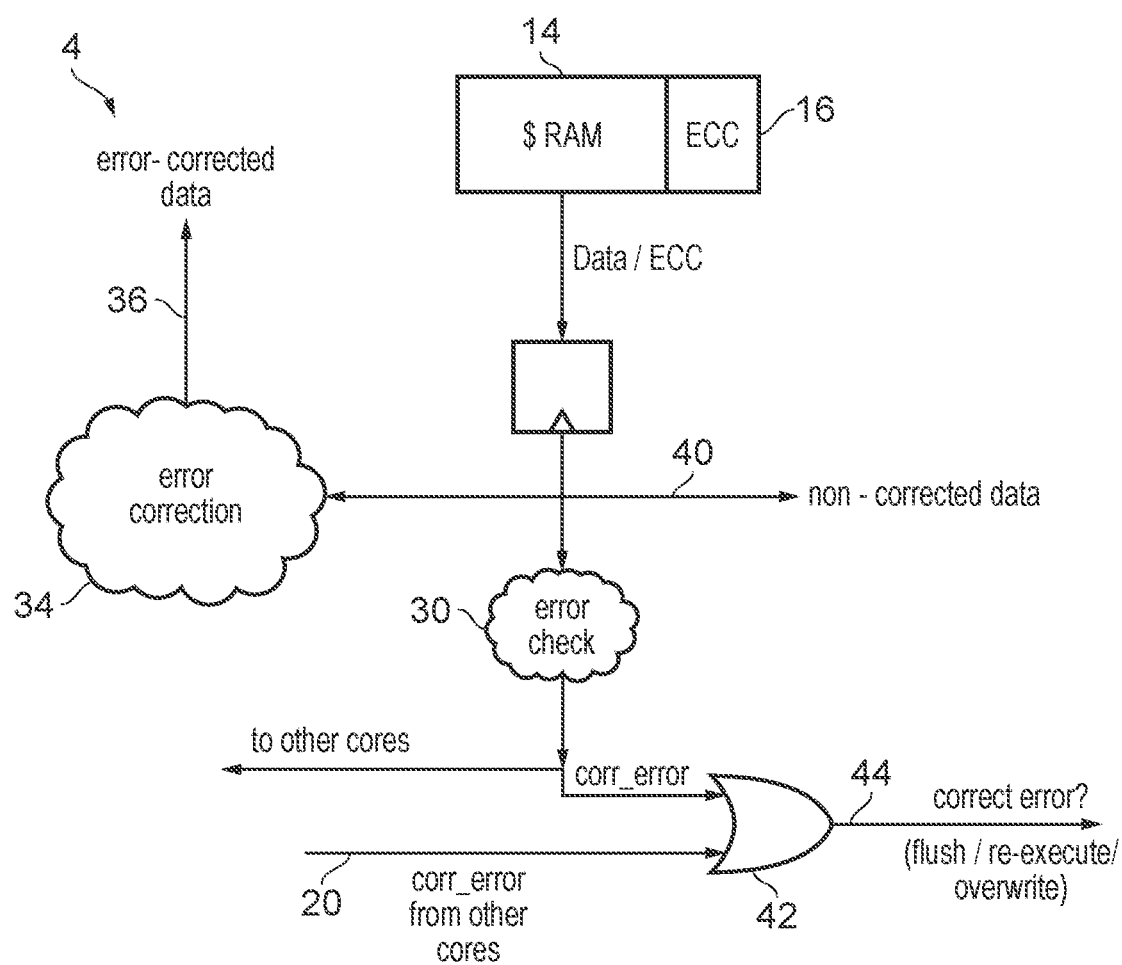
FIG. 3 shows a second example of the error detection circuitry and error correction circuitry.

FIG. 3 shows an alternative example of the internal logic of a given processing element (each of the elements may have the same design). In this example, when data is read from the cache then again it is passed to error detection circuitry 30 and error correction circuitry 34 as in the example of FIG. 2. Again, the non-corrected data can be provided along a path 40 bypassing the error correction circuitry 34. However, in this implementation, when an error is detected by the error detection circuitry 30 in the current core 4 or any of the other cores as signalled by the cross-core error detection signal 20, then the OR gate 42 asserts its output 44, and this controls the processor core 4 to flush its pipeline and re-execute at least the instruction which encountered the error and any younger instructions. In the meantime, the error corrected data 36 generated by the error correction circuitry 34 may be written back to the cache 14 to overwrite the erroneous data value, so that when the instructions are re-executed they will encounter a correct value which can then be processed over the non-corrected data path 40. Hence, with this approach rather than attempting to correct the data inline while enabling the instruction to proceed without re-execution, in FIG. 3 the pipeline is flushed and a delay is incurred by having to re-execute the same instructions based on the overwritten data. Again, this error correction operation will incur a latency and so by having an erroneous core signal its error to other cores this can allow all of those cores to trigger the same error correction operation to incur an equivalent latency and keep the cores in lockstep.

Figure 4:
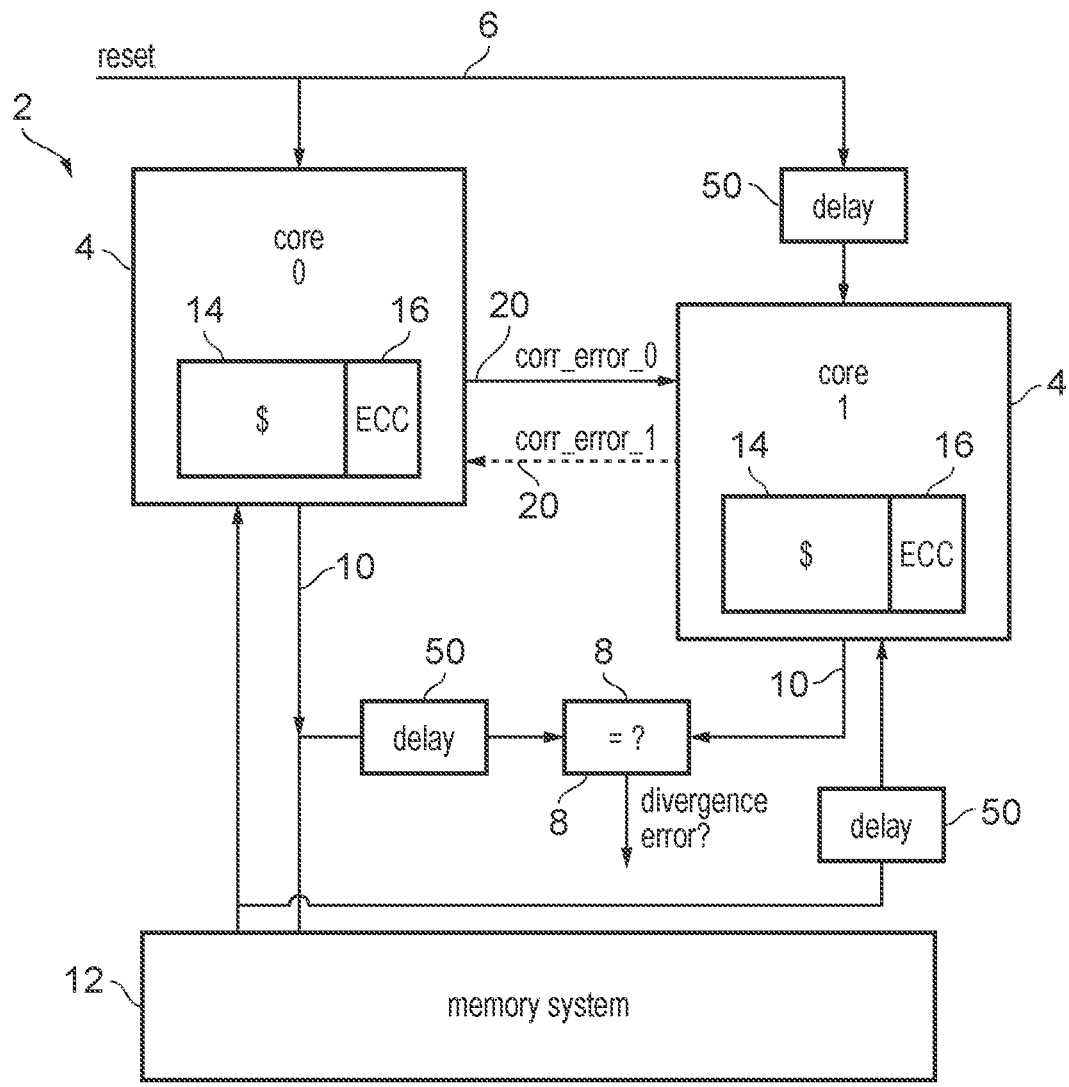
FIG. 4 shows an example of an apparatus in which there is a non-zero time offset between the respective processing elements processing the same processing workload.

FIG. 4 shows a second example of a data processing 2 having two redundant cores 4 for redundantly processing the same workload. However in this system there is a non-zero time offset between corresponding operations of the respective cores. Additional delay elements 50 are added on the reset input to core 1, the input to the divergence comparator 8 which receives the memory access request 10 form core 0 and the memory response path which provides responses to the memory access request from the memory system 12 to core 1. Hence, core 0 is an earlier processing element, and core 1 is a later processing element, which will perform the same operations as core 0, but core 1 will perform a given operation after core 0 performed that same operation. This delay can add extra robustness against common mode failure, since if for example a clock signal encounters a glitch, then this will tend to affect different processing operations performed on the respective cores, and so the comparison by the divergence comparator 8 can detect the glitch through diverging outcomes of the same processing operation on each core 4.

The earlier core 0 may signal its correctable errors to core 1 using a cross-core error signal 20 in the same way as discussed above. For example both cores 4 may have the logic shown in FIG. 2 or FIG. 3 for handling the error detection and correction, and so the logic in core 1 may receive the error signal 20 from core 0 so that core 1 can delay its processing when a correctable error is detected at core 0.

However, as core 1 lags behind, there may not be time for the error signal 20 in the other direction to reach core 0 in time for the processing operation which corresponds to the erroneous operation at core 1 to be delayed at core 0. Hence in some embodiments the cross-core error signalling may be only in one direction, from the earlier core 0 to the later core 1. In this case, the OR gate 32 within the logic of FIG. 2 or 3 provided within core 0 may have the second input 20 corresponding to cross-core error signal from core 1 permanently clamped to zero, and there may be no signalling of errors from core 1 at all. In other examples, as shown in the dotted line in FIG. 4, correctable errors detected at core 1 may still be signalled to core 0, but in this case some additional delays may be provided as shown in FIG. 5 or 6 in order to allow the later detection of an error in core 1 to be signalled in time for an operation in core 0 to be held back.

Figure 5:
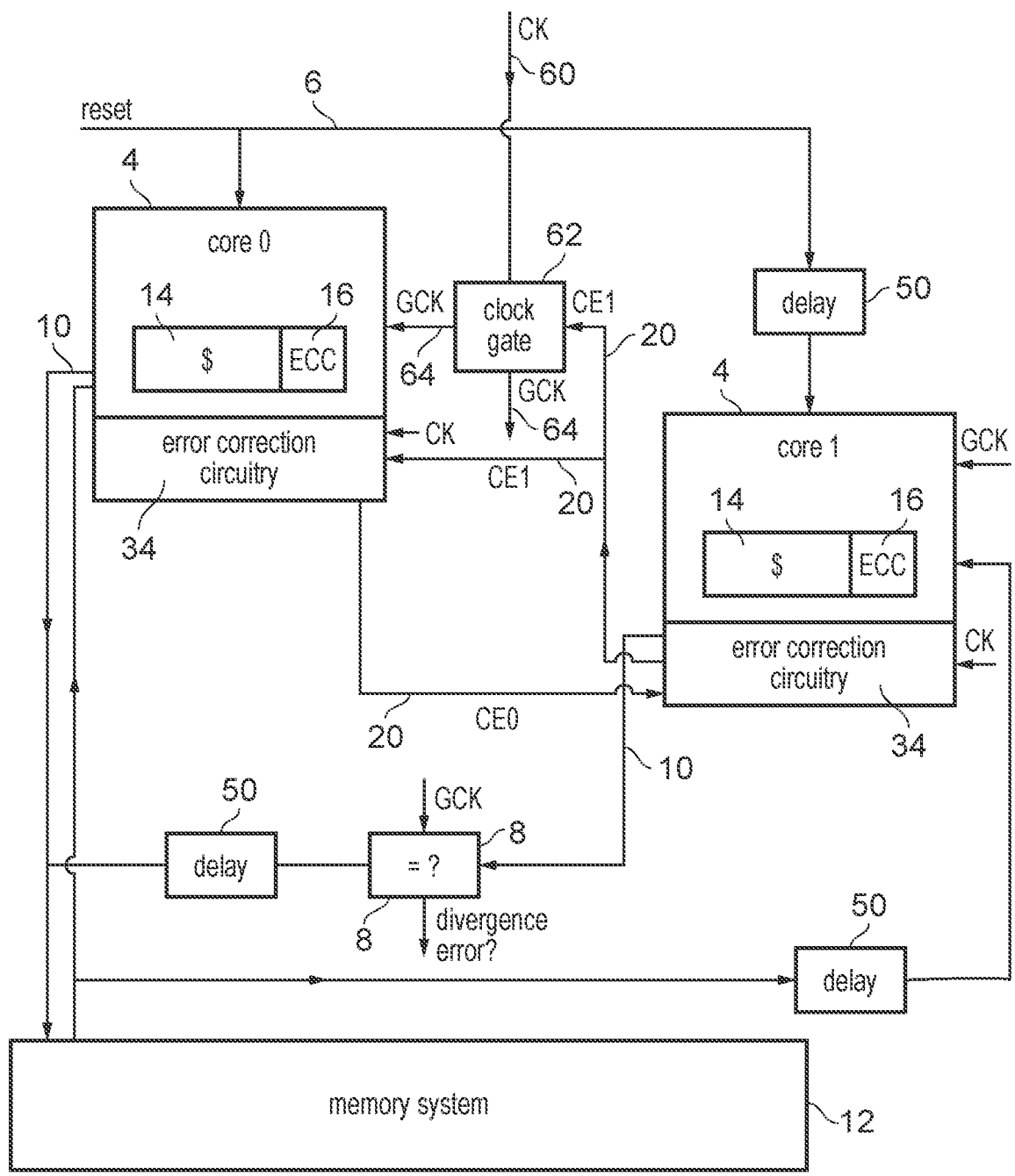
FIG. 5 shows a first example of a technique for allowing later processing elements to signal a correctable error to an earlier processing element.
Figure 6:
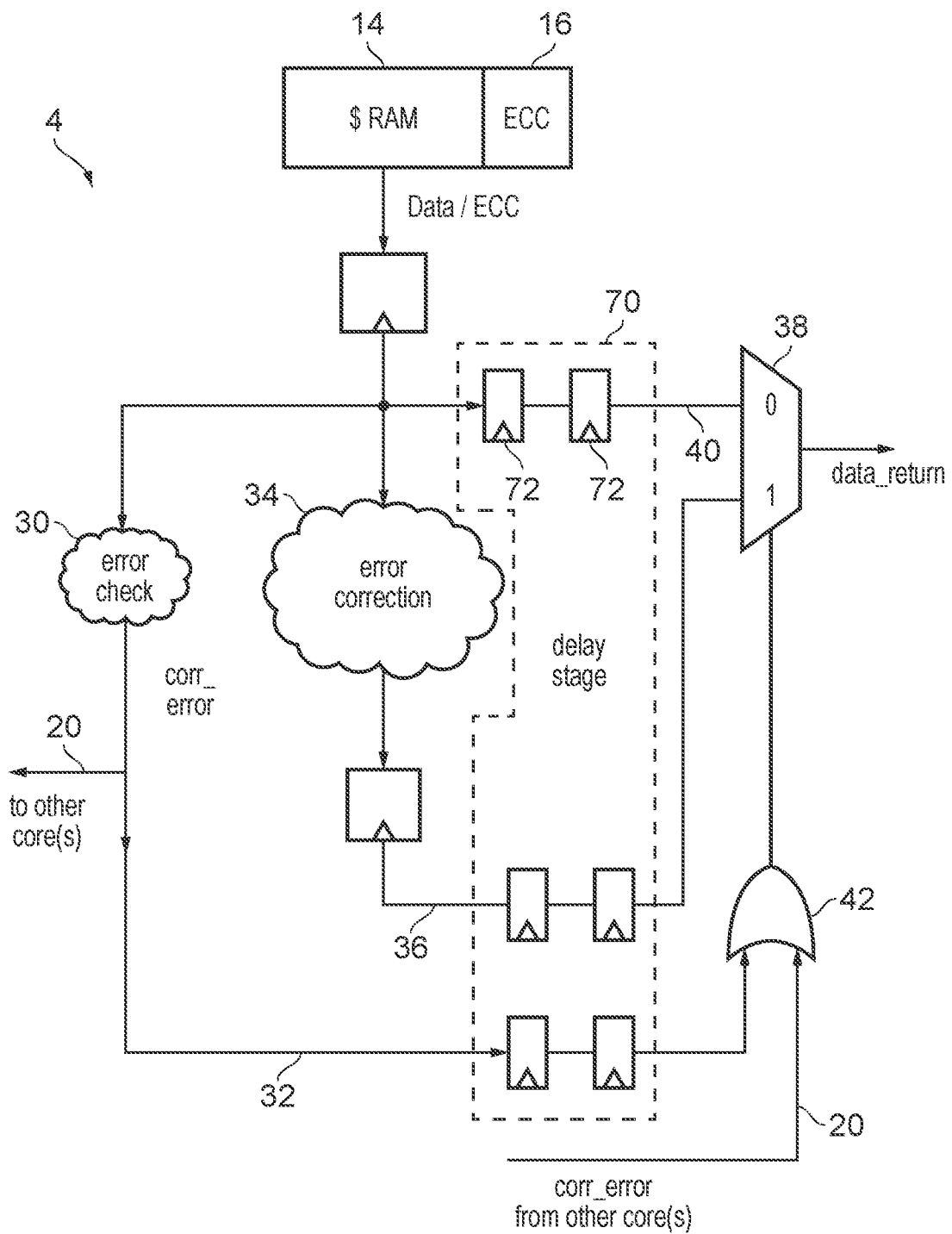
FIG. 6 shows a second example of a technique for allowing the later processing element to trigger an earlier processing element to delay processing when a correctable error is detected at the later processing element.

FIG. 5 shows a first approach for incurring these extra delays using clock gating. Both cores 4 are clocked based on a common clock signal 60 (labelled CK). A clock gate 62 is provided, controlled by the cross-core error signal from core 1. When no error has been detected by core 1, then the clock gate simply passes through the original clock signal CK without modification, so that a gated clock GCK 64 is the same as the input clock CK. The gated clock GCK 64 is supplied to portions of core 0 and core 1 other than their error correction circuitry 34, as well as being supplied to the divergence comparator 8. On the other hand, the error correction circuitry 34 within both cores 4 receives the ungated clock signal CK 60, and so it is not affected by any clock gating applied by the clock gate 62.

When a correctable error is detected at core 0, then the cross-core error signal 20 (CE0) is sent to core 1 and this triggers core 1 to inject an error and perform the same error correction process as core 0 in order to maintain the cores in lockstep, as described above.

However, when a correctable error is detected at core 1 then in addition to providing the error signal 20 (CE1) to core 0, CE1 also controls the clock gate 62 to suppress the generation of some clock pulses so as to freeze the operation of the parts of the cores 4 which are not involved in the error correction, and to freeze divergence comparisons by the divergence comparator 8. This provides additional time for the signal CE1 from core 1 to reach the error correction circuitry 34 (and related control logic such as multiplexer 38 or the pipeline flush control logic, which may also be clocked by CK not GCK) at core 0 so that the error correction circuitry can then trigger the appropriate delay needed to allow the corresponding operation at core 0 to be delayed or flushed and re-executed using corrected values. Once the error correction circuitry 34 has reached a given point of its operation then the cross-core CE1 signal may be deasserted and then the clock gate 62 may once more allow pulses of the input clock 60 to be transmitted as pulses of the gated clock 64 to allow processing to resume. Hence, by temporarily freezing the operation of parts of the system other than the error correction circuitry 34, this allows errors in the later core to be signalled to the earlier core in time for allowing the relevant processing operation to be delayed and the error correction process to be triggered to maintain both cores in lockstep.

FIG. 6 shows an alternative approach, in which rather than selectively applying a delay through clock gating as shown in FIG. 5, instead a fixed delay is provided by a delay stage 70 within the logic for controlling error detection and error correction within each processing core 4. FIG. 6 is based on the example of FIG. 2, but it will be appreciated that a similar delay stage 70 could be introduced into the example of FIG. 3. FIG. 6 is the same as in FIG. 2 except that additional flip flops 72 have been introduced on the bypass signal path 40 providing the non-corrected data, the error correction signal path 36 providing the corrected data generated by the error correction logic 34 and the signal path 32 which provides the error signal detected by the error detection circuitry 30 which indicates that an error has occurred within the current processor core 4. The cross-core error signal 20 from other cores is not delayed as shown in the bottom right of FIG. 6. This extra delay 70 which is incurred on each read from the cache 14 means that there is sufficient time for the cross-core signal 20 from the later core 1 in a time-shifted system to reach the earlier core 0 before the corresponding processing operation has progressed beyond the point at which it would be possible to trigger the error correction process. Hence, this can allow cross-injection of errors in both directions (from core 1 to core 0 as well as from core 0 to core 1). Although the delay stage 70 is introduced to allow core 0 to receive the information on correctable errors detected at core 1, the logic within core 1 will also need to include a corresponding delay stage 70 to ensure that the two cores remain in lockstep with a fixed timing relationship between them.

While one may think that this additional delay stage 70 would harm performance by incurring an extra delay on every operation, in practice once the processing pipeline is fully filled then the pipeline means that this delay is hidden, as the incremental delay of each successive instruction may merely be a single cycle. The delay may only be seen when the pipeline has been flushed or reset and is being filled up. Nevertheless, this performance penalty may be considered acceptable to make the system more robust against failures of redundancy. Also, the delay through the additional delay stage 70 may still be less than the delay associated with the error correction signal path, so this approach still avoids the cost of incurring the full delay of the error correction signal path on every operation.

Figure 7:
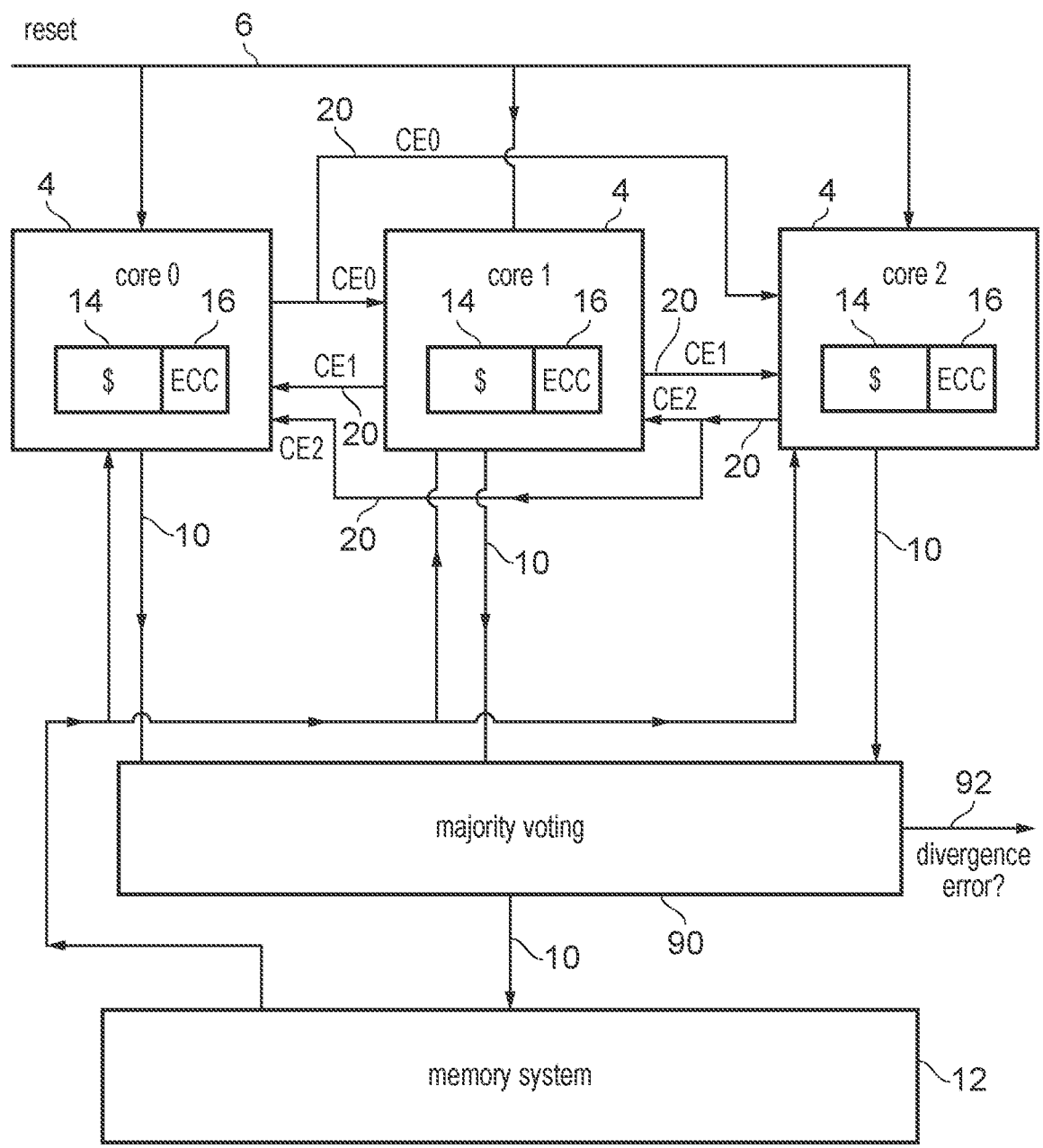
FIG. 7 shows another example showing a triple-core lockstep system.

The examples above show a two-core lockstep system. However as shown in FIG. 7 it is also possible to provide a triple-core lockstep system, where three (or more) redundant processor cores 4 are provided. In this case, the divergence comparator 8 may be replaced with majority voting circuitry 90 which receives the memory access requests 10 issued by each of the cores 4 and compares them to detect whether they are the same. If one of the cores generates a different memory access request from the other two cores then the majority voting circuitry signals a divergence error 92 which may trigger the one core which diverged to be removed from operation so that processing may continue on the other two cores. The memory access request 10 issued by the majority of the cores (i.e. the request which was the same on two of the same cores) is passed on to the memory system, and responses to the memory access request are passed to any active cores.

As shown in FIG. 7, similar to the dual-core lockstep example, each core may signal any detected correctable errors to every other core in the triple core lockstep system, to allow the cores to remain in lockstep when a correctable is detected at any one of the cores. Hence, by triggering error correction processes at the non-erroneous cores as well as the erroneous core which encountered the correctable error, this ensures that each core incurs an equal delay in performing the correction, to improve reliability as this means that when one core encounters a correctable error this will not be seen as the divergence by the majority voting circuitry 90 and so there is no need to remove one of the cores from the system due to divergence, which would otherwise reduce the reliability of the system.

Figure 8:
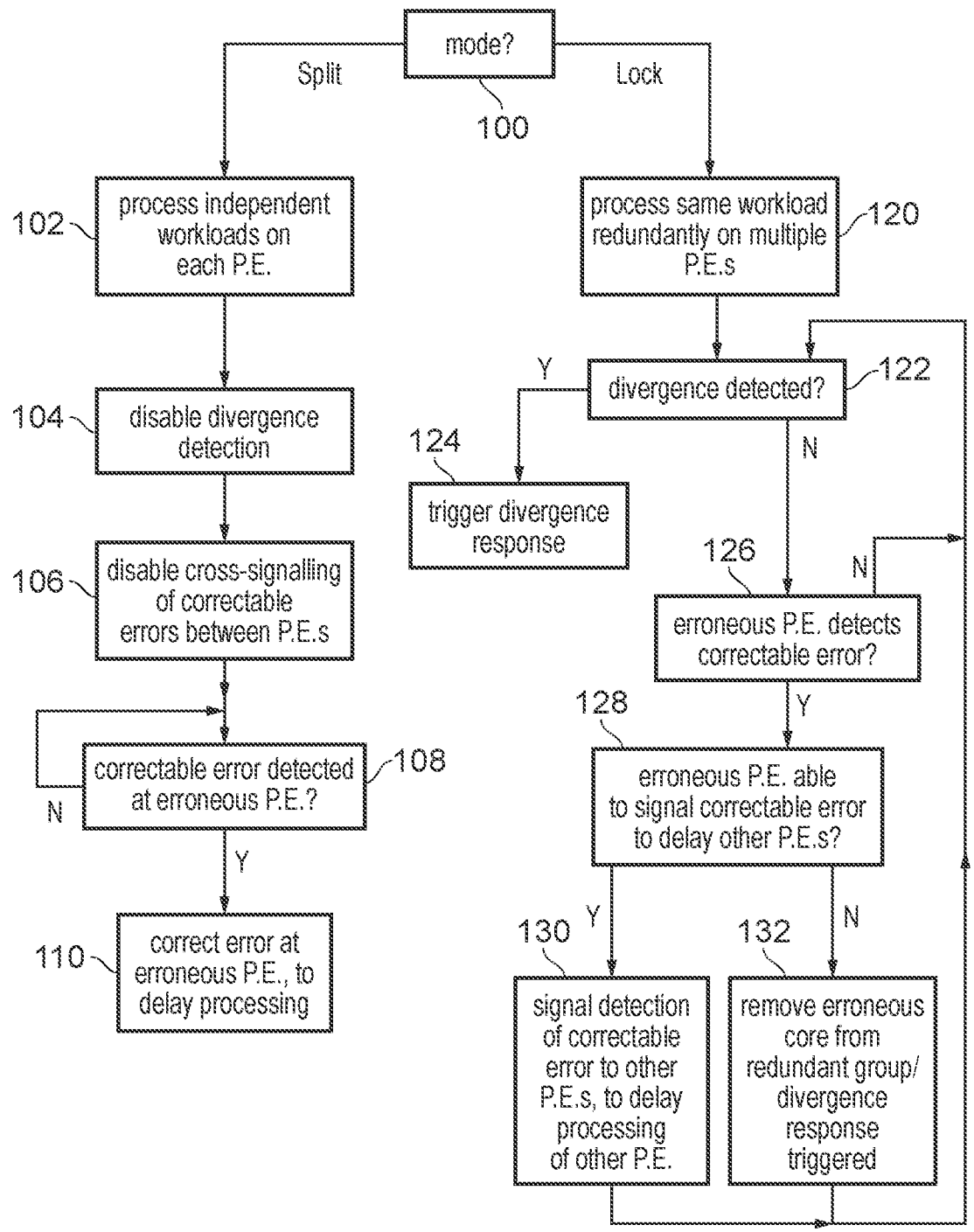
FIG. 8 is a flow diagram showing a method of controlling processing in a system supporting a split mode and a lock mode.

It is not essential for the redundant cores 4 to permanently operate in lockstep mode. In some cases the system may support a split mode where the cores can operate independently as well as a lock mode where the cores operate redundantly and have their outputs compared by the divergence detection circuitry 8, 90. FIG. 8 is a flow diagram showing processing in the split and lock modes respectively.

At step 100 the current mode of operation is determined. The mode of operation could be statically configured for a given processing system, for example by hard wiring or fusing certain configurable storage elements to permanently indicate that the system should operate in one of the split mode or the lock mode. This would allow the mode to be used for a particular hardware device to be selected during manufacturing, but nevertheless allows the same overall processor design to be used on a range of applications which may either require split mode or lock mode. Alternatively, the mode could be dynamically configurable, for example based on boot data which is loaded at reset. For example, a system which is to be used in an automotive vehicle for controlling safety-critical systems such as braking or steering, or a processing system designed for space-based applications based in a satellite or spacecraft could be configured to use the lock mode, to provide additional functional safety and/or protection against increased likelihood of interference from subatomic particles or electromagnetic radiation when located outside the protection of the Earth's atmosphere.

If the system is in the split mode then at step 102 the respective processing elements 4 are configured to process independent workloads on each of the processing elements. At step 104 the divergence detection by the divergence detection logic 8, 90 is disabled and at step 106 the cross signalling of correctable errors between processing elements is also disabled. For example the input of the OR gate 42 which receives the cross-core error signals 20 from other cores may be permanently clamped to 0, so that in this case the error correction process within a given core is only performed when the error detection circuitry of that particular core detects a correctable error, not when other cores detect correctable errors.

In the split mode, at step 108 each core checks for correctable errors using its error detection circuitry 30, and if a given erroneous processing element 4 detects an error then at step 110 that particular erroneous processing element performs an error correction process and will delay its processing, but this does not affect the other cores.

If the current mode selected at step 100 is the lock mode then at step 120 the respective redundant processing elements are configured to each process the same workload. Alternatively, in some systems there may be multiple sets of redundant elements, and in this case the redundant elements within the same set may redundantly process the same workload, but a second set of redundant elements could be processing a different workload to the first set.

At step 122 the divergence detection circuitry 8, 90 detects whether any divergence has been detected between two or more cores within the same set of redundant elements, and if so then at step 124 a divergence response is triggered. For example the divergence response may be removing an erroneous core from active use to allow processing to continue with reduced redundancy on remaining cores, or could comprise resetting the system, or signalling an error by providing a light or audible warning, or by transmitting a message to an external device to indicate that failure of redundancy has been detected. The particular divergence response taken may depend on the particular field of use.

If no divergence is detected then the processing elements may continue with their processing. Meanwhile, in parallel with the divergence detection, at step 126 it is determined whether any erroneous processing element has detected a correctable error using its detection circuitry 30. If not, then processing loops through steps 122 and 126 as processing of instructions continues on each of the redundant cores. The method breaks from the loop when either divergence is detected at step 122 or a correctable error is detected at step 126.

When an erroneous processing element detects a correctable error then if the erroneous processing element is able to signal correctable errors to delay other processing elements (step 125), then at step 130 the detection of the correctable error is signalled to other processing elements and those processing elements delay their processing to match the delay incurred in the error correction process at the erroneous processing element. For example those other processing elements may trigger the same error correction process even though there was no actual error at those other processing elements. If the erroneous processing element is not able to signal a correctable error to delay other processing elements (for example core 1 in the example of FIG. 4 may not be able to do so) then at step 132 the correctable error may be treated as a redundancy failure and the erroneous core may be removed from the redundant group or the same divergence response may be triggered as at step 124. In practise, by simply ignoring the correctable error in cases where it is not possible to signal the correctable error to all the other processing elements in the redundant set, this will then lead to divergence being detected at step 122 and so no specific action may be required to handle the correctable error in cases when it is not possible to be signalled to other processing elements.

Hence, in summary the techniques discussed above provide cross-injection of correctable errors in a multi-core lockstep system, to avoid divergence or loss of redundancy. This allows execution past a correctable error without the performance penalty of requiring logic to use "always correct" data paths which always incur the full latency of error correction.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An apparatus comprising:
    a plurality of processing elements to redundantly process a same processing workload; and
    divergence detection circuitry to detect divergence between the plurality of processing elements;
    each processing element comprising error detection circuitry to detect a correctable error in that processing element, and error correction circuitry to correct the correctable error; in which:
    when a correctable error is detected by the error detection circuitry of an erroneous processing element, the erroneous processing element is configured to signal detection of the correctable error to another processing element, to control the other processing element to delay processing to maintain a predetermined time offset between the erroneous processing element and the other processing element.

2. The apparatus according to claim 1, in which the other processing element is configured to delay processing by performing an error correction operation using the error correction circuitry of the other processing element.

3. The apparatus according to claim 2, in which the error correction operation comprises flushing and re-executing at least one instruction.

4. The apparatus according to claim 2, in which the error correction operation comprises delaying execution of an instruction to allow the instruction to use a delayed output of the error correction circuitry.

5. The apparatus according to claim 1, in which the predetermined time offset is zero.

6. The apparatus according to claim 1, in which the predetermined time offset is non-zero.

7. The apparatus according to claim 1, in which the plurality of processing elements include an earlier processing element and a later processing element, for which the earlier processing element is configured to perform a given processing operation before the later processing element performs the same given processing operation.

8. The apparatus according to claim 7, in which the earlier processing element is able to control the later processing element to delay processing when a correctable error is detected at the earlier processing element.

9. The apparatus according to claim 8, in which the later processing element is unable to control the earlier processing element to delay processing when a correctable error is detected at the later processing element.

10. The apparatus according to claim 8, in which the later processing element is able to control the earlier processing element to delay the processing when a correctable error is detected at the later processing element.

11. The apparatus according to claim 10, comprising clock gating circuitry responsive to detection of a correctable error at the later processing element to gate a clock signal supplied to a portion of the earlier processing element other than the error correction circuitry, a portion of the later processing element other than the error correction circuitry; and the divergence detection circuitry.

12. The apparatus according to claim 10, in which each processing element comprises delay circuitry to provide an additional delay between error detection by the error detection circuitry and a processing operation using a value on which the error detection is performed, regardless of whether a correctable error is detected at that processing element or at another processing element.

13. The apparatus according to claim 1, in which the plurality of processing elements have:
    a split mode in which the plurality of processing elements are configured to process independent processing workloads; and
    a lock mode in which the plurality of processing elements are configured to redundantly process the same processing workload.

14. The apparatus according to claim 13, in which:
    in the lock mode, the erroneous processing element is able to control the other processing element to delay processing when a correctable error is detected at the erroneous processing element; and
    in the split mode, the erroneous processing element is unable to control the other processing element to delay processing when a correctable error is detected at the erroneous processing element.

15. The apparatus according to claim 1, in which the correctable error comprises an error in a stored value detected by the error detection circuitry based on an error detecting code or error correcting code associated with the stored value.

16. The apparatus according to claim 15, in which the error correction circuitry is configured to correct the correctable error by generating an error-corrected value of a stored value based on an error correcting code associated with the stored value.

17. The apparatus according to claim 15, in which, when the stored value is read-only information stored in a cache, the error correction circuitry is configured to correct the correctable error by requesting re-fetching of the read-only information from a memory system.

18. An apparatus comprising:
- a plurality of means for data processing for redundantly processing a same processing workload; and
- means for detecting divergence between the plurality of means for data processing;
- each means for data processing comprising means for detecting a correctable error in that means for data processing, and means for correcting the correctable error; in which;
- when a correctable error is detected by the means for detecting of an erroneous means for data processing, the erroneous means for data processing is configured to signal detection of the correctable error to another means for data processing, to control the other means for data processing to delay processing to maintain a predetermined time offset between the erroneous means for data processing and the other means for data processing.

19. A method for an apparatus comprising a plurality of processing elements; the method comprising:
- redundantly processing a same processing workload on the plurality of processing elements;
- detecting divergence between the plurality of processing elements;
- detecting a correctable error in an erroneous processing element, the correctable error being correctable by error correction circuitry of the erroneous processing element; and in response to detection of the correctable error in the erroneous processing element, signalling detection of the correctable error to another processing element, to control the other processing element to delay processing to maintain a predetermined time offset between the erroneous processing element and the other processing element.

* * * * *